Patented Dec. 25, 1951

2,580,271

UNITED STATES PATENT OFFICE 2,580,271

CROSSLINKED SULFONATED POLYSTYRENE

Massimo Baer, Springfield, Mass., assignor to Monsanto Chemical Company, St. Louis, Mo., a corporation of Delaware No Drawing. Application August 11, 1949, Serial No. 109,813

14 Claims. (Cl. 260—45.2)

This invention relates to new synthetic resinous materials. More particularly the invention relates to partially or totally insoluble derivatives of water-soluble sulfonated polystyrenes.

Water-soluble sulfonated polystyrenes are somewhat difficult to prepare since the normal sulfonating agents and processes almost invariably lead to either insoluble products or to products which cannot be economically separated from the reaction ingredients. In my copending applications S. N. 109,811, now Patent 2,533,210, and S. N. 109,812, now Patent 2,533,211, I have set forth two efficient and easily controlled processes for preparing completely water-soluble sulfonated polystyrenes together with processes for increasing the viscosity of water solutions thereof.

The sulfonated polystyrenes of this invention may be prepared by reacting a polystyrene having a molecular weight of from 30,000 to 500,000, as calculated by the Staudinger equation, with a coordination complex of sulfur trioxide with either dioxane or bis-(beta-chlorethyl) ether at temperatures below 15° C. until the produce contains on the average from 0.5 to 2 sulfonic acid groups per styrene unit. Sulfonated polystyrenes made by this process are completely water-soluble and their aqueous solutions vary widely in viscosity depending on the molecular weight of the polystyrene, the conditions of the sulfonation reaction, and to a lesser extent upon the number of sulfonic acid groups attached to each styrene unit.

However, for some uses it is desirable to modify the water-soluble sulfonated polystyrenes by other means to increase their viscosity and to make it possible to cure them to an insoluble and infusible state.

It is an object of this invention to modify water-soluble sulfonated polystyrenes.

A further object is to increase the viscosity of completely water-soluble polystyrenes.

Still another object is to provide a process and composition for curing water-soluble sulfonated polystyrenes to an insoluble and infusible state.

These and other objects are attained by reacting a water-soluble sulfonated polystyrene with a methylol derivative of an aminoplast or an ether thereof.

The following examples are given by way of illustration and are not intended as limitations on the scope of this invention. Where parts are mentioned they are parts by weight.

Example I

A reaction mixture was prepared by slurrying 100 parts of a sulfonated polystyrene in ethylene dichloride and adding to the slurry 10 parts of a butyl ether of methylol melamine. The sulfonated polystyrene had been prepared from a polystyrene having a molecular weight of about 65,000 and contained on the average about 1.2 sulfonic acid groups per styrene unit. The butyl ether of methylol melamine had been obtained by reacting hexamethylol melamine with normal butanol under acid conditions. The slurry was agitated at 25° C. for about 30 minutes. The solid material was then recovered by filtration and washed with ethylene dichloride. The product was a fusible white powder which was insoluble in organic solvents and which swelled only slightly in water. However, it was easily dispersed in water to form a suspension which could be used as a binder in printing pastes, textile impregnants, etc. It could be cured to an insoluble infusible state by short heating at 100–150° C.

Example II

Example I was repeated except that the amount of the butyl ether of methylol melamine was reduced to 3 parts. The product was still soluble in water but the viscosity in an aqueous solution was greatly increased. Extremely small amounts of this material may be used to impart high viscosity to aqueous emulsions and dispersions.

Example III

A sulfonated polystyrene was dissolved in water to prepare a 10% aqueous solution. Ten parts, based on 100 parts of sulfonated polystyrene, of trimethylol melamine were dissolved in the solution which appeared clear and homogeneous. The solution was cast onto glass plates which were then heated at about 130° C. for about 20 minutes. The heating process evaporated the water and left a clear slightly brittle insoluble, infusible film having a thickness of about 0.5 mil.

Example IV

Example III was repeated except that dimethylol urea was substituted for the methylol melamine. The product was similar to that of Example III.

Solutions containing mixtures of sulfonated polystyrenes and trimethylol melamine or dimethylol urea may be used in coating and impregnating processes. They may be modified with other resins, plasticizers, dyes, pigments, lubricants, etc. and they may be cured after the coating or impregnating operation by heating at temperatures ranging from 100–150° C.

The methylol derivatives of aminoplasts are prepared by reaction of formaldehyde with amino or amido compounds including urea, thiourea, aminotriazines such as melamine, ammeline, 2,4,6-triphenyl-triamino-1,3,5-triazine, dicyandiamide, linear polyamides of the nylon type etc. These products are either water-soluble or water-dispersible and react easily and quickly with sulfonated polystyrenes under acid conditions. The methylol aminoplasts which have been modified by reacting them with alcohols under acid conditions to yield ethers will also react with the water-soluble sulfonated polystyrenes in the same manner. Among the alcohols which may be used to prepare the ethers are aliphatic alcohols such as methanol, ethanol, isopropanol, butanol, 2-ethyl hexanol, lauryl alcohol, stearyl alcohol, etc. and aralkyl alcohols such as benzyl alcohol, phenyl ethyl alcohol, phenyl butyl alcohol, etc. The preferred ethers are those prepared from the lower aliphatic alcohols containing from 1 to 8 carbon atoms.

The amount of the methylol aminoplast or ether derivative thereof which may be used can be varied from about 1 to about 20 parts per 100 parts of sulfonated polystyrene. In the the range of from about 1 to about 5 parts of the aminoplast, the reaction products are still water-soluble although the viscosity of the water solutions thereof are much higher than that of the unmodified sulfonated polystyrene. These high viscosity water-soluble products may be used as thickeners for emulsions or dispersions to be used as printing pastes, textile impregnants, etc. Between 5 and 20 parts of aminoplast derivative, the reaction products with water-soluble sulfonated polystyrenes are insoluble in water or only slightly swollen thereby. These products are clear and nearly colorless and fusible. They may be used prior to the curing step to impregnate textile and paper materials and then cured in situ by the application of heat.

The most efficient and easiest way to carry out the process of this invention is to react the various ingredients either in a water solution or a water suspension. However, it is possible and in some case might be preferred to carry out the reaction in an organic solvent solution. The temperature of the reaction may be varied between 25° C. and 150° C. Below 25° C. substantially no reaction takes place within a reasonable period of time. Between 25 and 75° C. the reaction is slow and may be easily stopped short of incomplete water insolubility to obtain the products which are useful as thickeners, emulsifying agents and protective colloids. Above 75° C. and up to 150° C., the reaction is quite rapid and the products are insoluble and generally infusible. Above 150° C. decomposition occurs and the products are worthless.

The products of this invention may be used as thickeners, emulsifying agents and protective colloids in aqueous media. They may also be used as the basis for printing pastes and textile impregnants.

It is obvious that many variations may be made in the products and process of this invention as defined in the appended claims.

What is claimed is:

1. A product of the reaction at 25–150° C. of 100 parts of a water-soluble sulfonated polystyrene with from 1 to 20 parts of a methylol aminoplast taken from the group consisting of the water-soluble and water-dispersible formaldehyde condensation products of urea, thiourea, dicyandiamide, aminotriazines and linear polyamides and the ethers of said condensation products, said sulfonated polystyrene having been derived from a polystyrene having a molecular weight of from 30,000 to 500,000 as calculated by the Staudinger equation and containing from 0.5 to 2.0 sulfonic acid groups per styrene unit.

2. A product as in claim 1 wherein the formaldehyde condensation products are limited to from 1 to 5 parts per 100 parts of the sulfonated polystyrene.

3. A product as in claim 1 wherein the sulfonated polystyrene is derived from a polystyrene having a molecular weight of about 65,000 and containing an average of 1.2 sulfonic acid groups per styrene unit.

4. A product as in claim 3 wherein the condensation product is trimethylol melamine.

5. A product as in claim 3 wherein the condensation product is dimethylol urea.

6. A product as in claim 3 wherein the condensation product is a butyl ether of hexamethylol melamine.

7. A product as in claim 1 wherein the condensation products are the ethers derived from aliphatic alcohols containing from 1 to 8 carbon atoms.

8. A process which comprises heating at 25–150° C., 100 parts of a water-soluble sulfonated polystyrene with from 1 to 20 parts of a methylol aminoplast taken from the group consisting of the water-soluble and water-dispersible formaldehyde condensation products of urea, thiourea, dicyandiamide, aminotriazines and linear polyamides and the ethers of said condensation products, said sulfonated polystyrene having been derived from a polystyrene having a molecular weight of from 30,000 to 500,000 as calculated by the Staudinger equation and containing from 0.5 to 2.0 sulfonic acid groups per styrene unit.

9. A process as in claim 8 wherein the formaldehyde condensation products are limited to from 1 to 5 parts per 100 parts of sulfonated polystyrene.

10. A process as in claim 8 wherein the sulfonated polystyrene is derived from a polystyrene having a molecular weight of about 65,000 and contains an average of 1.2 sulfonic acid groups per styrene unit.

11. A process as in claim 10 wherein the condensation product is trimethylol melamine.

12. A process as in claim 10 wherein the condensation product is dimethylol urea.

13. A process as in claim 10 wherein the condensation product is a butyl ether of hexamethylol melamine.

14. A process as in claim 8 wherein the condensation products are the ethers derived from aliphatic alcohols containing from 1 to 8 carbon atoms.

MASSIMO BAER.

REFERENCES CITED

The following references are of record in the file of this patent:

FOREIGN PATENTS

| Number | Country | Date |
|---|---|---|
| 852,875 | France | Mar. 5, 1940 |